United States Patent
Vala et al.

(10) Patent No.: US 12,340,611 B2
(45) Date of Patent: Jun. 24, 2025

(54) METHOD AND ELECTRONIC DEVICE FOR INTELLIGENTLY SHARING CONTENT

(71) Applicant: Samsung Electronics Co., Ltd., Suwon-si (KR)

(72) Inventors: Vanraj Vala, Bengaluru (IN); Sukumar Moharana, Bengaluru (IN); Siva Prasad Thota, Bengaluru (IN); Debi Prasanna Mohanty, Bengaluru (IN); Arun Mudigere Giddegowda, Bengaluru (IN); Sriram Shashank, Bengaluru (IN); Tarun Gopalakrishnan, Bengaluru (IN); Dwaraka Bhamidipati Sreevatsa, Bengaluru (IN); Sri Lakshmi Punuru, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 17/965,475

(22) Filed: Oct. 13, 2022

(65) Prior Publication Data
US 2023/0113292 A1 Apr. 13, 2023

(30) Foreign Application Priority Data

Oct. 13, 2021 (IN) .............................. 202141046730
Oct. 7, 2022 (IN) ............................. 2021 41046730

(51) Int. Cl.
*G06V 30/414* (2022.01)

(52) U.S. Cl.
CPC ................................. *G06V 30/414* (2022.01)

(58) Field of Classification Search
None
See application file for complete search history.

(56) References Cited

U.S. PATENT DOCUMENTS 11,055,822 B2 7/2021 Ramanujam et al.
11,188,359 B2 11/2021 Thota et al.
(Continued)

FOREIGN PATENT DOCUMENTS

| CN | 111327516 A | 9/2021 | |
|---|---|---|---|
| WO | WO-2020219094 A1 * | 10/2020 | ......... G06F 21/6245 |
| WO | 2020/227449 A1 | 11/2020 | |

OTHER PUBLICATIONS

Orekondy et. al. "Connecting Pixels to Privacy and Utility: Automatic Redaction of Private Information in Images," Max Planck Institute for Informatics, Saarland Informatics Campus Saabrucken, Germany, 2018.

(Continued)

*Primary Examiner* — Andrew H Lam
(74) *Attorney, Agent, or Firm* — Jefferson IP Law, LLP

(57) ABSTRACT

A method for intelligently sharing a content by an electronic device is provided. The method includes determining, by the electronic device, a context of sharing the content. The method includes analyzing, by the electronic device, the content with reference to the context. The method includes identifying, by the electronic device, portions of the content as non-shareable based on the analysis. The method includes providing, by the electronic device, a modification action suggestion on the portions identified as non-shareable.

9 Claims, 19 Drawing Sheets

(56) References Cited

U.S. PATENT DOCUMENTS

2011/0154209 A1    6/2011  Fan et al.
2012/0250951 A1*  10/2012  Chen .................... G06Q 50/01
                                                                382/118

OTHER PUBLICATIONS

Indian Office Action dated Jul. 5, 2024; Indian Appln. No. 202141046730.
Indian Office Action dated Aug. 9, 2023; Indian Appln. No. 202141046730.

* cited by examiner

METHOD AND ELECTRONIC DEVICE FOR INTELLIGENTLY SHARING CONTENT

CROSS-REFERENCE TO RELATED APPLICATION(S)

This application is based on and claims priority under 35 U.S.C. § 119(a) of an Indian Provisional patent application number 202141046730, filed on Oct. 13, 2021, in the Indian Intellectual Property Office, and of an Indian Complete patent application number 202141046730, filed on Oct. 7, 2022, in the Indian Intellectual Property Office, the disclosure of each of which is incorporated by reference herein in its entirety.

BACKGROUND

1. Field

The disclosure relates to an electronic device. More particularly, the disclosure relates to a method and the electronic device for intelligently sharing a content

2. Description of Related Art

Sharing of content such as videos, images, documents, texts, etc. is a crucial feature in existing electronic devices such as smartphone, tablet, computer, etc. Generally, a user is fine to share the content that includes critical information such as personal/private information or censorable information or confidential information to personal/official/known contacts in an electronic device. But the user can also accidentally share the content includes the critical information to social media applications or unknown contacts in the electronic device, which is a serious privacy and security threat to the user. FIGS. 1A and 1B illustrate examples of the content that includes the critical information, according to the related art. Images of a flight ticket (11), a registration number of a vehicle (12), an identification card (13) of a person, a financial card (14), a high skin exposure scene (15), a nude scene (16), a legal document (17) contain the personal/private information or the censorable information or the confidential information.

At certain scenarios, the user manually makes modification in portions in the content that contain the critical information in order to hide that critical information while sharing the content to the social media applications or the unknown contacts. However, the manual process of making the modification in the content is a hectic task to the user, which degrades user experience. There is no method yet available to automatically detect such portions in the content and make an appropriate modification on the content such as beautification, pixilation, masking, cropping, etc. Thus, it is desired to provide a useful solution to the user for automatically detecting the critical information in the content and provide appropriate suggestions for sharing the content.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for intelligently sharing a content. While invoking content sharing by the user, the electronic device automatically checks for portions in the content that contains critical information such as personal/private information or censorable information or confidential information. Upon finding the portions in the content contains critical information, the electronic device applies one or more modifications on the portion in the content that contains the critical information. Further, the electronic device shares the modified content based on a medium (e.g. private medium or social medium) and/or a contact (e.g. known contact (i.e. contact of a person known to the user) or unknown contact (i.e. contact of a person unknown to the user)) to which the content needs to share, which improves user experience.

Another aspect of the disclosure is to suggest appropriate modifications on the portions such as beautification, pixilation, masking, cropping, etc. to the user upon finding the portions in the content that contains critical information while invoking the content sharing. Further, the electronic device applies one or more modifications on the portions based on a user selection of the suggested modifications, and shares the modified content, which ensures privacy and security in the content sharing.

Additional aspects will be set forth in part in the description which follows and, in part, will be apparent from the description, or may be learned by practice of the presented embodiments.

In accordance with an aspect of the disclosure, a method for intelligently sharing a content by an electronic device is provided. The method includes determining, by the electronic device, a context of sharing the content. The method includes analyzing, by the electronic device, the content with reference to the context. The method includes identifying, by the electronic device, portions of the content as non-shareable based on the analysis. The method includes providing, by the electronic device, a modification action suggestion on the portions identified as non-shareable.

In an embodiment, the context comprises a contact class and application properties, wherein the contact class comprises classification of contacts in the electronic device into a private contact or a public contact, and wherein the application properties comprise a target image resolution and a medium type of an application.

In an embodiment, the modification action suggestion comprises cropping, masking, blurring, pixelating, or beautification.

In an embodiment, determining, by the electronic device, the context of sharing the content, comprises receiving, by the electronic device, a trigger to share the content to a contact in the electronic device through an application, fetching, by the electronic device, a contact class of the contact and/or application properties of the application from a share context database, and determining, by the electronic device, the context of sharing the content by concatenating the contact class and/or the application properties.

In an embodiment, identifying, by the electronic device, the portions of the content as non-shareable based on the analysis, comprises detecting, by the electronic device, a first text and a visual portion in the content, where the visual portion comprises of a text block, a tabular block, and an image, identifying, by the electronic device, the image in the visual portion by creating a plurality of bounding boxes on the text block, the tabular block, and the image, extracting, by the electronic device, a second text from the text block, and the tabular block, determining, by the electronic device, a semantic description of the identified image, estimating, by the electronic device, a shareability score for each portion of the content based on the first text, the second text, the semantic description, or the context, and identifying, by the electronic device, the portions of the content with the shareability score less than a threshold shareability score as non-shareable.

In an embodiment, estimating, by the electronic device, the shareability score for each portion of the content based on the first text, the second text, the semantic description, or the context comprises determining, by the electronic device, sensitivity of the content based on the first text, the second text, the semantic description, identifying, by the electronic device, the medium type of the application and the contact class from the context, and determining, by the electronic device, the shareability score based on the sensitivity of the content, the medium type of the application and the contact class.

In an embodiment, identifying, by the electronic device, the image in the visual portion by creating the plurality of bounding boxes on the text block, the tabular block, and the image comprises determining, by the electronic device, a relation between the plurality of bounding boxes by analyzing the text block, the tabular block, and the image using a neural network, merging, by the electronic device, two or more bounding boxes in the plurality of bounding boxes based on the relation between the plurality of bounding boxes, and selecting, by the electronic device, a largest bounding box as the image in the visual portion upon merging two or more bounding boxes.

In accordance with another aspect of the disclosure, an electronic device for intelligently sharing the content is provided. The electronic device includes a multi-fold content transformer, a memory, a processor, where the multi-fold content transformer is coupled to the memory and the processor. The multi-fold content transformer is configured for determining the context of sharing the content. The multi-fold content transformer is configured for analyzing the content with reference to the determined context. The multi-fold content transformer is configured for identifying the portion of the content as non-shareable based on the analysis. The multi-fold content transformer is configured for providing at least one modification action suggestion on the portions identified as non-shareable.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
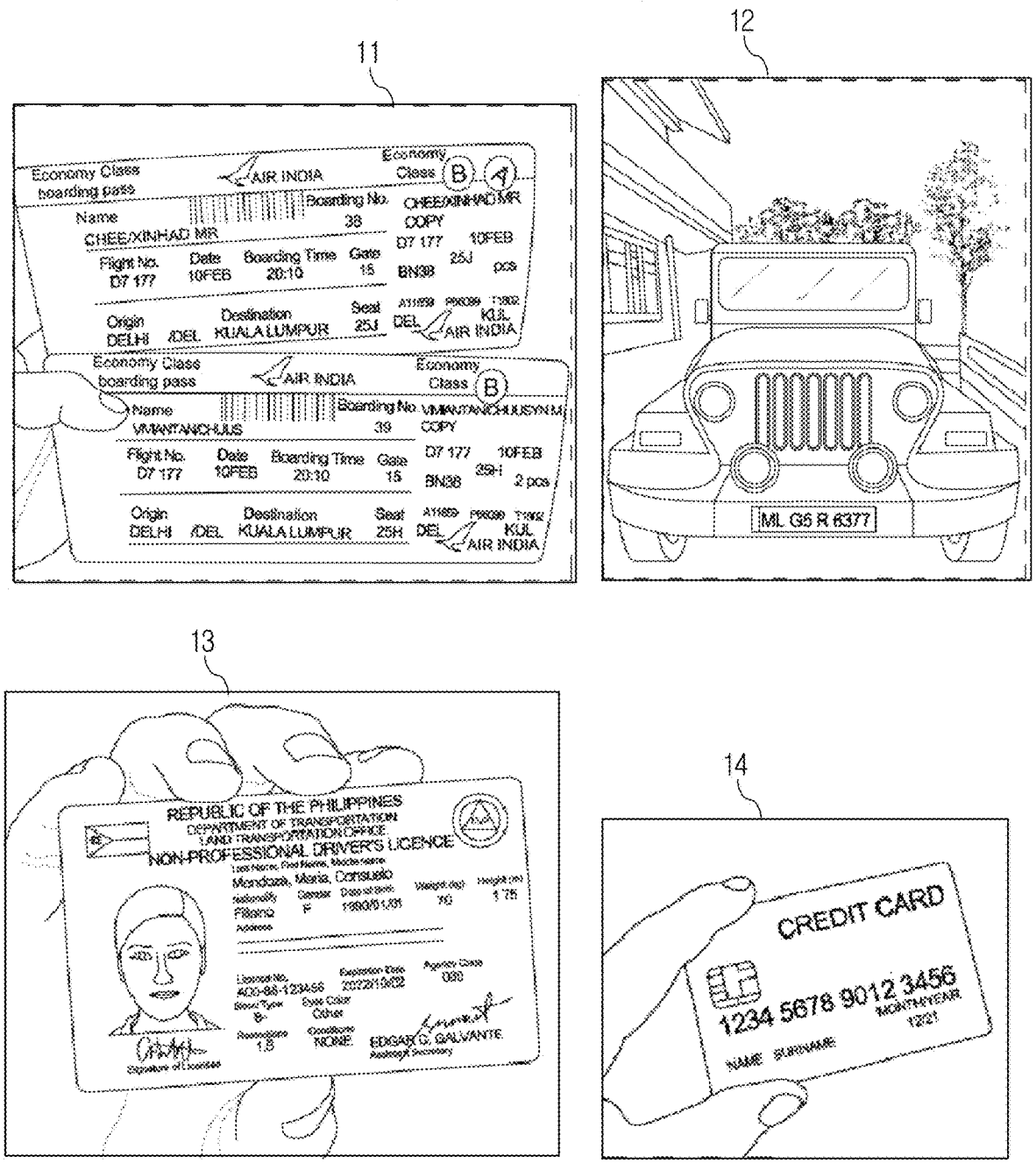
FIGS. 1A and 1B illustrate examples of content includes personal/private information or censorable information or confidential information, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for intelligently sharing a content by an electronic device. The method includes determining, by the electronic device, a context of sharing the content. The method includes analyzing, by the electronic device, the content with reference to the determined context. The method includes identifying, by the electronic device, portions of the content as non-shareable based on the analysis. The method includes suggesting, by the electronic device, a modification action on the portions identified as non-shareable.

Accordingly, the embodiments herein provide the electronic device for intelligently sharing the content. The electronic device includes a multi-fold content transformer, a memory, a processor, where the multi-fold content transformer is coupled to the memory and the processor. The multi-fold content transformer is configured for determining the context of sharing the content. The multi-fold content transformer is configured for analyzing the content with reference to the determined context. The multi-fold content transformer is configured for identifying the portion of the content as non-shareable based on the analysis. The multi-fold content transformer is configured for suggesting the modification action on the portions identified as non-shareable.

The electronic device detects shareability of the given content in the context of the sharing and suggests one or more user selectable modification actions on the content. For detecting the shareability, the electronic device determines a shareability score of the given content based on validation parameters like readability of a text in the content, visual clarity of the content, percentage of pixels of the content, adversarial nature of an image in the content, transformation of orientations of the content caused due to change in resolution, aliasing caused due to change in resolution, etc. and privacy and sensitivity with respect to a medium of an application for sharing the content and provides the modifications suggestions, where the modifications suggestions contain a fixed set of modifications applied to predefined type of content.

The electronic device determines the medium of sharing based on validation parameters like type of content (e.g. screenshot, image, document, etc.), and items (e.g. personal, scene in image, type of information in document, etc.) present in the content. Further, the electronic device suggests additional enhancements like a group of enhancements suitable to be applied to the type of content, or a group of enhancements suitable to be applied to the content based on suggested medium of sharing Unlike existing methods and systems, the electronic device automatically checks for the portions in the content that contains critical information such as personal/private information or censorable information or confidential information while invoking content sharing by the user. Upon finding the portions in the content contains critical information, the electronic device applies one or more modifications on the portion in the content that contains the critical information. Further, the electronic device shares the modified content based on a medium (e.g. private medium or social medium) and/or a contact (e.g. private medium or social medium) and/or a contact (e.g. known contact (i.e. contact of a person known to the user) to which the content needs to share, which improves user experience.

Unlike existing methods and systems, the electronic device suggests appropriate modifications on the portions such as beautification, pixilation, masking, cropping, etc. to the user upon finding the portions in the content that contains the critical information while invoking the content sharing. Further, the electronic device applies one or more modifications on the portions based on a user selection of the suggested modifications, and shares the modified content, which ensures privacy and security in the content sharing.

Referring now to the drawings, and more particularly to FIGS. 2, 3, 4A, 4B, 5 to 10, 11A, 11B, 12 to 14, 15A, and 15B, there are shown preferred embodiments.

Figure 2:
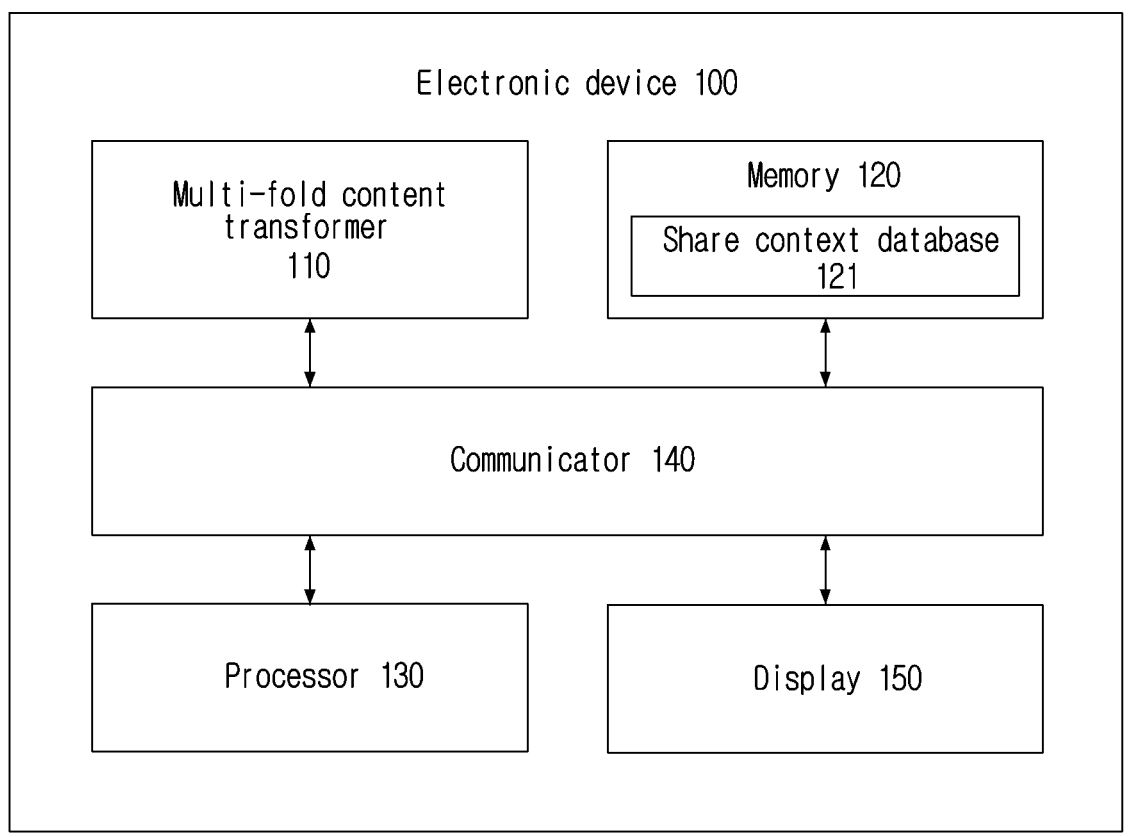
FIG. 2 is a block diagram of an electronic device for intelligently sharing a content, according to an embodiment of the disclosure.

FIG. 2 is a block diagram of an electronic device (100) for intelligently sharing a content, according to an embodiment of the disclosure.

The content can be a visual content (e.g. image, video, screenshot, etc.), a textual content (e.g. a message, a description, a document, etc.) or a combination of the visual content and the textual content. Examples of the electronic device (100) include, but are not limited to a smartphone, a tablet computer, a Personal Digital Assistance (PDA), a desktop computer, an Internet of Things (IoT), a wearable device, etc. In an embodiment, the electronic device (100) includes a multi-fold content transformer (110), a memory (120), a processor (130), a communicator (140), and a display (150), where the display (150) displays the content and suggestions to a user. Examples of the display (150) include, but are not limited to a light emitting diode display, a liquid crystal display, a projector, etc.

The memory (120) includes the share context database (121) for storing a context of sharing the content. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

The multi-fold content transformer (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The multi-fold content transformer (110) determines the context of sharing the content. The context includes the contact class and the application properties. The contact class includes classification of contacts in the electronic device (100) into a private contact or a public contact. The multi-fold content transformer (110) classifies a contact into the private contact when the contact is known/personal to a user of the electronic device (100). If the contact is a trusted contact or a favorite contact, or a frequent contact, then the multi-fold content transformer (110) classifies the contact into the private contact. The multi-fold content transformer (110) classifies a contact into a public contact when the contact is not classified as a private contact. The application properties include a target image resolution (e.g. 50×50 pixels) and a medium type of an application. In an embodiment, the multi-fold content transformer (110) uses an aspect ratio (e.g. 2:3) recommended by the application for sharing the content. The medium type of the application can be private medium or social/public medium. The medium type of a personal messaging application is the private medium, whereas the medium type of a social interacting application is the social/public medium.

The multi-fold content transformer (110) analyzes the content with reference to the determined context. The multi-fold content transformer (110) identifies the portion of the content as non-shareable based on the analysis. The multi-fold content transformer (110) suggests the modification action on the portions identified as non-shareable. Examples for the modification action include, but not limited to cropping, masking, blurring, pixelating, beautification, etc.

In an embodiment, for determining the context of sharing the content, the multi-fold content transformer (110) receives a trigger to share the content to the contact in the electronic device (100) through the application. Further, the multi-fold content transformer (110) fetches the contact class of the contact and/or the application properties of the application from the share context database (121). Further, the multi-fold content transformer (110) determines the context of sharing the content by concatenating the contact class and/or the application properties.

In an embodiment, for identifying the portions of the content as non-shareable, the multi-fold content transformer (110) detects a first text and a visual portion in the content. The visual portion includes a text block, and/or a tabular block, and/or an image. Further, the multi-fold content transformer (110) identifies the image in the visual portion by creating a plurality of bounding boxes on the text block, the tabular block, and the image. Further, the multi-fold content transformer (110) extracts a second text from the text block, and the tabular block. Further, the multi-fold content transformer (110) determines a semantic description of the identified image.

Further, the multi-fold content transformer (110) estimates a shareability score for each portion of the content based on of the first text, the second text, the semantic description, and the context. The shareability score is a quantifiable score determined based on validation parameters of privacy and relevance. In an embodiment, the shareability score is determined based on the sensitivity of the content, the medium of sharing of the content, the contact with which the content is being shared. The occurrence of one or more above parameters (i.e. sensitivity, medium, contact) helps in determining the shareability score. As an example, the shareability score is high in case sensitivity of the content is lower than the threshold, the medium of sharing is a private medium and the people with which it is being shared are trustworthy people.

Further, the multi-fold content transformer (110) identifies the portions of the content with the shareability score less than a threshold shareability score as non-shareable, where the portions of the content with the shareability score less than the threshold shareability score contain critical information such as personal/private information, censorable information, confidential information, etc.

In an embodiment, for estimating the shareability score for each portion of the content based on of the first text, the second text, the semantic description, and the context, the multi-fold content transformer (110) determines sensitivity of the content based on the first text, the second text, the semantic description. Further, the multi-fold content transformer (110) identifies the medium type of the application and the contact class from the context. Further, the multi-fold content transformer (110) determines the shareability score based on the sensitivity of the content, the medium type of the application and the contact class.

In an embodiment, for identifying the image in the visual portion by creating the plurality of bounding boxes on the text block, the tabular block, the image, the multi-fold content transformer (110) determines a relation between the plurality of bounding boxes by analyzing the text block, the tabular block, and the image using a neural network. Further, the multi-fold content transformer (110) merges two or more bounding boxes in the plurality of bounding boxes based on the relation between the plurality of bounding boxes. Further, the multi-fold content transformer (110) selects a largest bounding box as the image in the visual portion upon merging two or more bounding boxes.

Figure 1B:
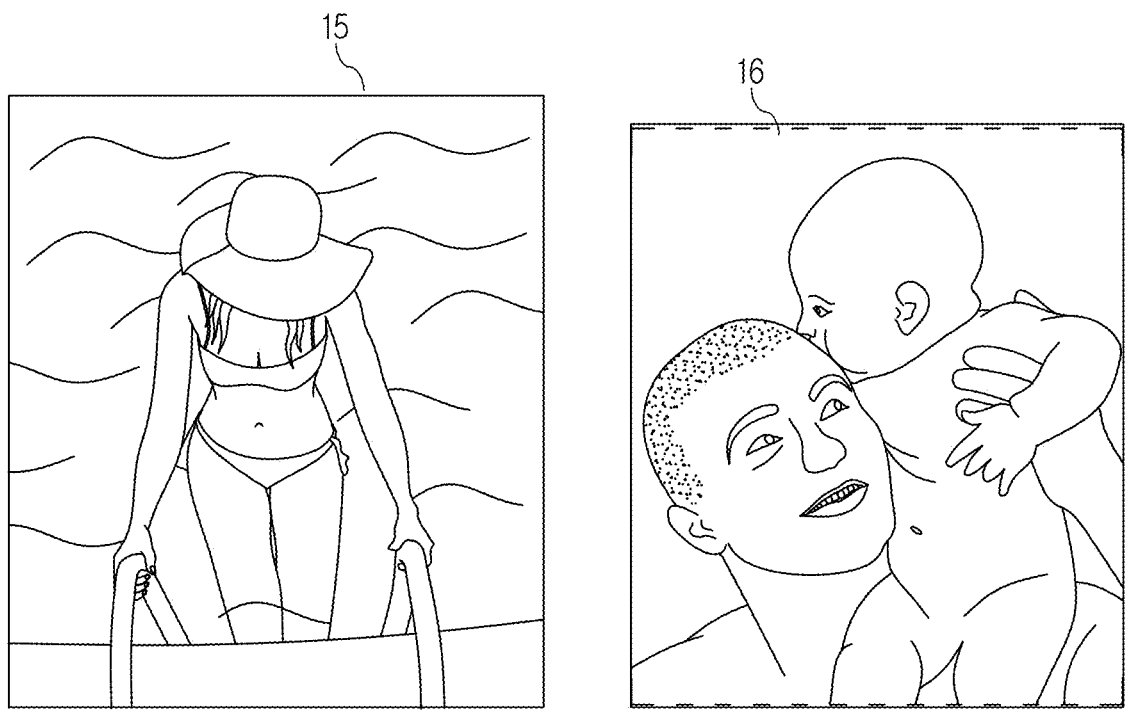
Figure 1B:
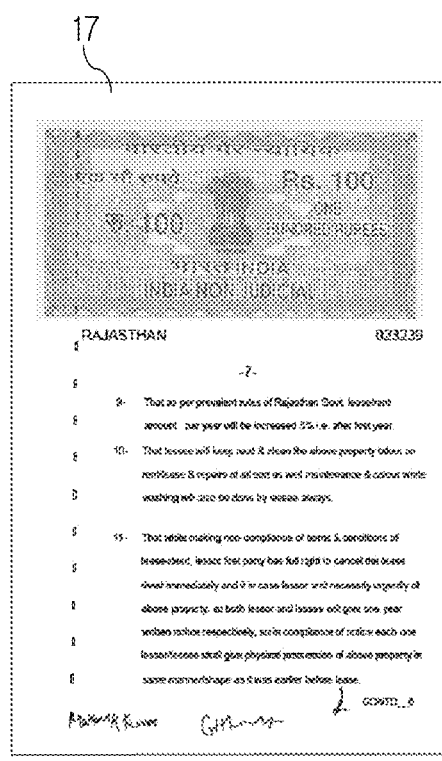

Although the FIGS. 1A and 1B show the hardware components of the electronic device (100) but it is to be understood that other embodiments are not limited thereon. In other embodiments, the electronic device (100) may include less or a greater number of components. Further, the labels or names of the components are used only for illustrative purpose and does not limit the scope of the disclosure. One or more components can be combined together to perform same or substantially similar function for intelligently sharing the content.

Figure 3:
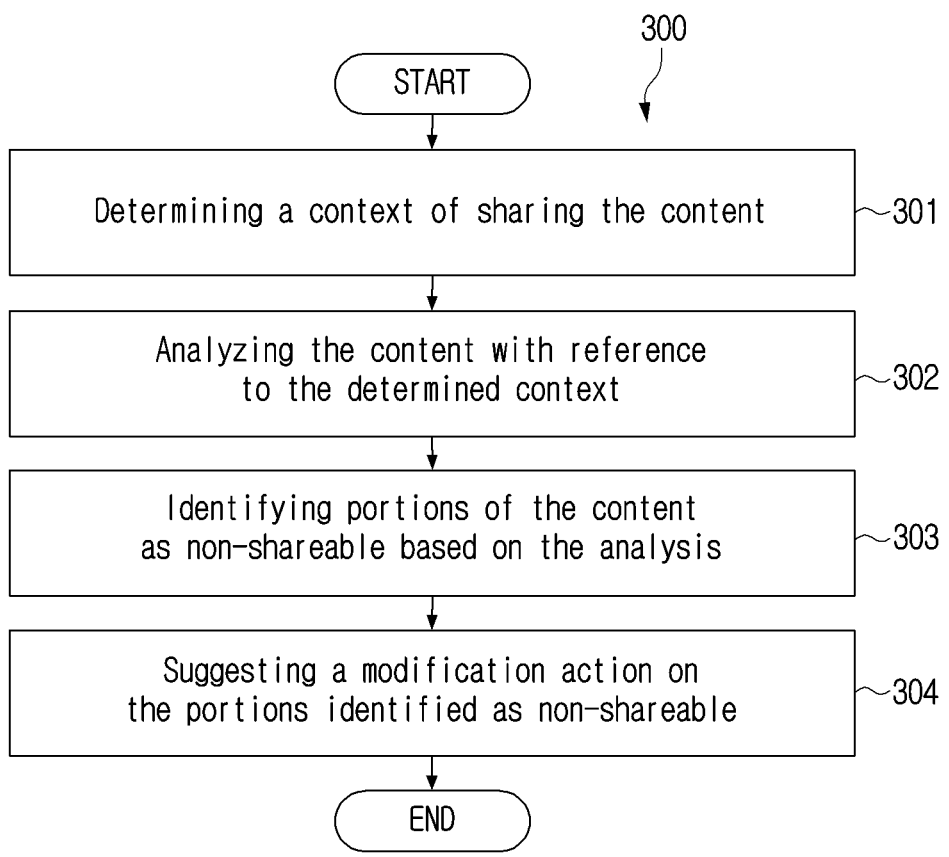
FIG. 3 is a flow diagram illustrating a method for intelligently sharing the content by the electronic device, according to an embodiment of the disclosure.

FIG. 3 is a flow diagram (300) illustrating a method for intelligently sharing the content by the electronic device (100), according to an embodiment of the disclosure.

Referring to FIG. 3, in an embodiment, the method allows the multi-fold content transformer (110) to perform operations 301 to 304 of the flow diagram (300). At operation 301, the method includes determining the context of sharing the content. At operation 302, the method includes analyzing the content with reference to the determined context. At operation 303, the method includes identifying the portions of the content as non-shareable based on the analysis. At operation 304, the method includes suggesting the modification action on the portions identified as non-shareable.

The various actions, acts, blocks, operations, or the like in the flow diagram (300) may be performed in the order presented, in a different order, or simultaneously. Further, in some embodiments, some of the actions, acts, blocks, operations, or the like may be omitted, added, modified, skipped, or the like without departing from the scope of the disclosure.

Figure 4A:
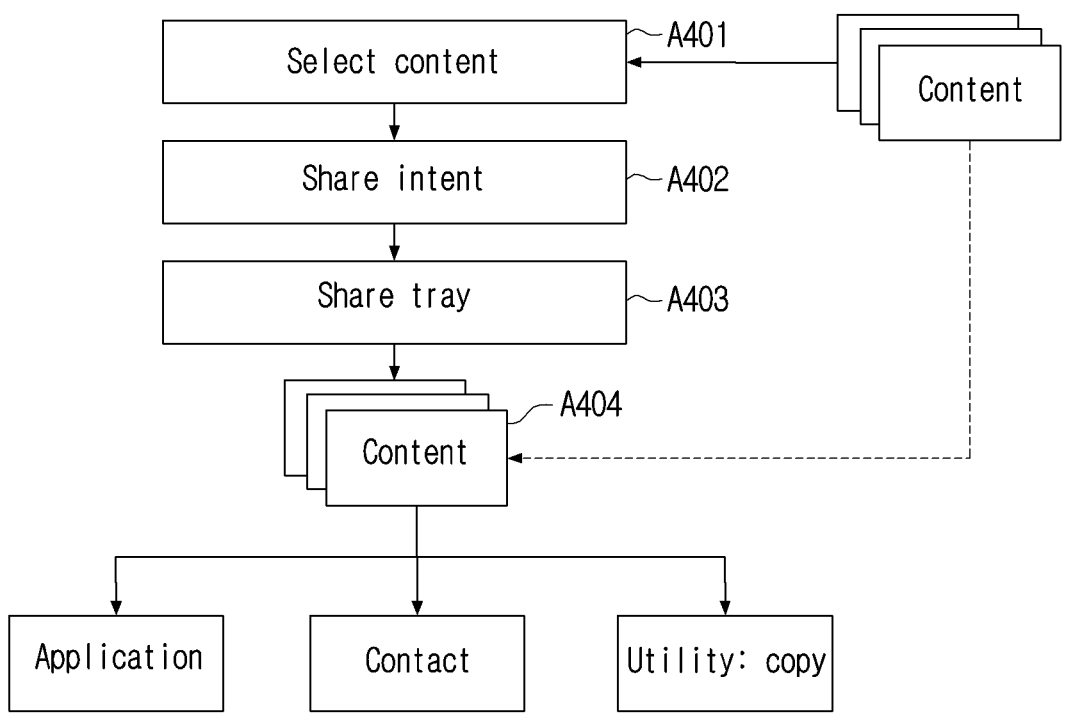
FIGS. 4A and 4B illustrate a comparison of a flow diagram of the proposed method with a flow diagram of an existing method for content sharing, according to various embodiments of the disclosure.
Figure 4B:
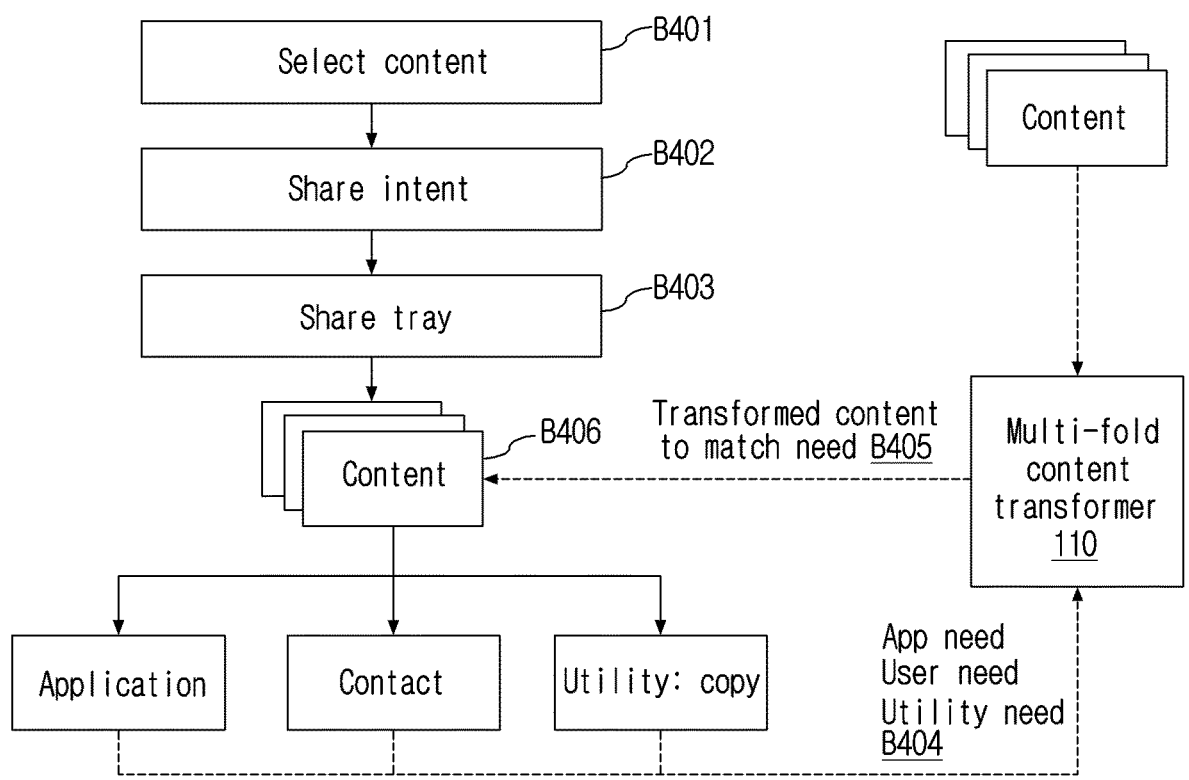

FIGS. 4A and 4B illustrate a comparison of a flow diagram of the proposed method with a flow diagram of an existing method for content sharing, according to various embodiments of the disclosure.

Consider, the few portions of the content include the critical information. The flow diagram of the existing method for content sharing is shown in the FIG. 4A. At operations A401 to A403, a conventional device receives user selection on the content, detects share intent of the user, and opens the share tray for sharing. At operation A404, the conventional device shares the content with the critical information to the application or the contact or for a utility purpose (e.g. copy) without bothering on the privacy and security need to ensure for the critical information in the content.

The flow diagram of the proposed method for content sharing is shown in the FIG. 4B. At operations B401 to B403, the electronic device (100) receives user selection on the content, detects share intent of the user, and opens the share tray for sharing. Unlike the existing method and the conventional device, at operations B404, B405, and B406 the electronic device (100) ensures the security and privacy of the content while sharing the content by analyzing the context of the content, transforming the critical information in the content (i.e. portion in the content that is un-sharable) based on the analysis, and shares the transformed content to the application or the contact or for the utility purpose (e.g. copy).

Figure 5:
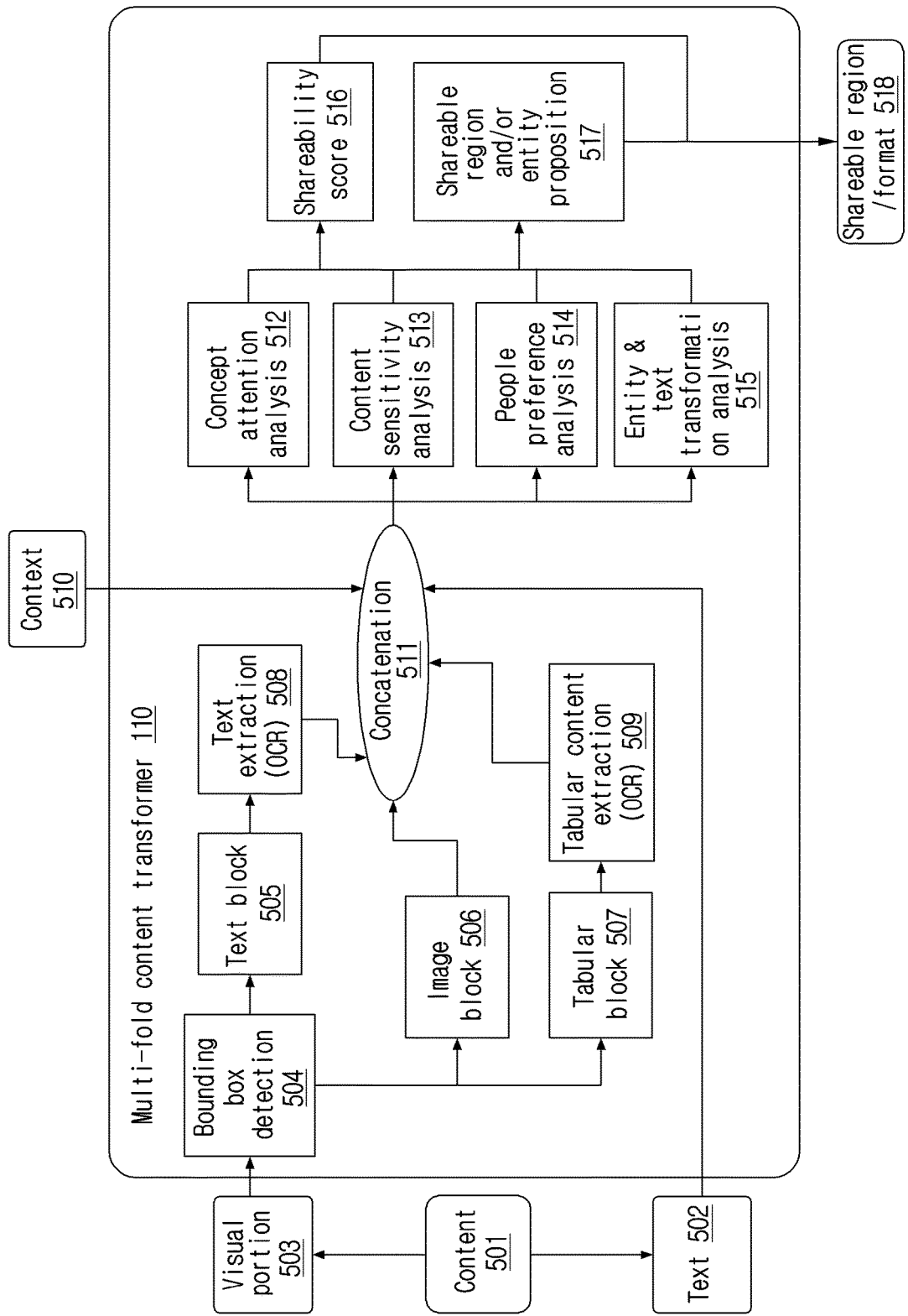
FIG. 5 is a flow diagram illustrating a method for suggesting a shareable region/format in the content by a multi-fold content transformer, according to an embodiment of the disclosure.

FIG. 5 is a flow diagram illustrating a method for suggesting a shareable region/format in the content by the multi-fold content transformer (110), according to an embodiment of the disclosure.

Referring to FIG. 5, the electronic device (100) receives the content at operation 501 for sharing. Further, the electronic device (100) determines the context at operation 510 of the content from the share context database (121). Further, the electronic device (100) determines the text at operation 502 (i.e. first text), and the visual portion at operation 503 in the content, Further, the electronic device (100) identifies the text blocks at operation 505, the image blocks at operation 506, and the tabular blocks at operation 507 by creating the bounding box at operation 504 on the objects in the visual portion. Further, the electronic device (100) extracts the tabular features at operation 509 from the table blocks and the textual features at operation 508 (i.e. second text) from the text blocks using an Optical Character Recognition (OCR) method.

Further, the electronic device (100) extracts the visual features from the image blocks and concatenates at operation 511 the visual features with the textual features, the tabular features, the text and the context. Further, the electronic device (100) performs the concept analysis at operation 512, the content sensitivity analysis at operation 513, the people preference analysis at operation 514, and an entity & text transformation analysis at operation 515 on the concatenated value of the visual features, the textual features, the tabular features, the text and the context. The electronic device (100) analyses the image blocks, the text blocks and the tabular blocks in the content using the neural network and detects the individual blocks. For performing the concept analysis, the electronic device (100) analyses the individual blocks to identify relations between them. Further, the electronic device (100) combines the related individual blocks to form single larger block, where the larger block is considered for suggestion.

In case of images, the electronic device (100) detects the various private contents like license plates, identifier (ID) cards, faces, etc. For performing the content sensitivity analysis, the electronic device (100) evaluates the detected blocks based on the class label and determines the corresponding confidence score. For the detected face blocks, the electronic device (100) uses the contact preference details to analyze the sensitivity. Further, the electronic device (100) determines the sensitivity score based on the target medium of the application of sharing. The final sensitivity score is determined based on the confidence scores of number plates of a vehicle, ID cards, faces labels, etc., and the contact type and the application properties obtained the share context database (121).

For performing the people preference analysis at operation 514, the electronic device (100) obtains people preference information from the share context database (121). The trustworthiness of a person with the contact is determined based on the trusted contact and/or the frequent contact, and/or the favorite contact listing of the contact during the people preference analysis at operation 514. If the person with the contact is listed in the trusted contact and/or the frequent contact, and/or the favorite contact, then the contact is considered as the private contact.

In case of the textual content, if an entity is identified in the source content, then the electronic device (100) performs the entity & text transformation analysis and decides a target representation of the entity based on the type of the entity and a current representation of the entity. The entity is a phrase that clearly identifies one item from a set of other items that have similar attributes. Examples of named entities are first and last names, geographic locations, ages, addresses, phone numbers, companies, addresses, etc. Such transformation results in the appropriate representation of the entity. A table of possible transformations for specific type of entities (e.g. a list of shopping items may be represented as a bulleted list.) are stored in the share context database (121).

The electronic device (100) determines the shareability score (516), shareable region and/or entity proposition at operation 517 based on the outputs obtained from the concept analysis, the content sensitivity analysis, the people preference analysis, and the entity & text transformation analysis.

The region corresponding to high shareable score within the content and conceptually related is identified in shareable region proposition. The electronic device (100) uses the larger block obtained from the concept attention analysis for the shareable region proposition. The electronic device (100) identifies the shareable entity proposition based on a following sequence of operations: Input Text→Entity Detection→Type of Entity Classification→Fetch appropriate entity representation from Share Context DB→Transform the detected entities into target transformation.

The electronic device (100) determines the shareable region/format at operation 518 based on the shareability score at operation 516 and shareable region and/or entity proposition at operation 517, where the shareable region is of the same format as that of the input content. For example, in case of an image content, the shareable region format is that of an image format. Similarly, for text content, the output format would be text format.

Figure 6:
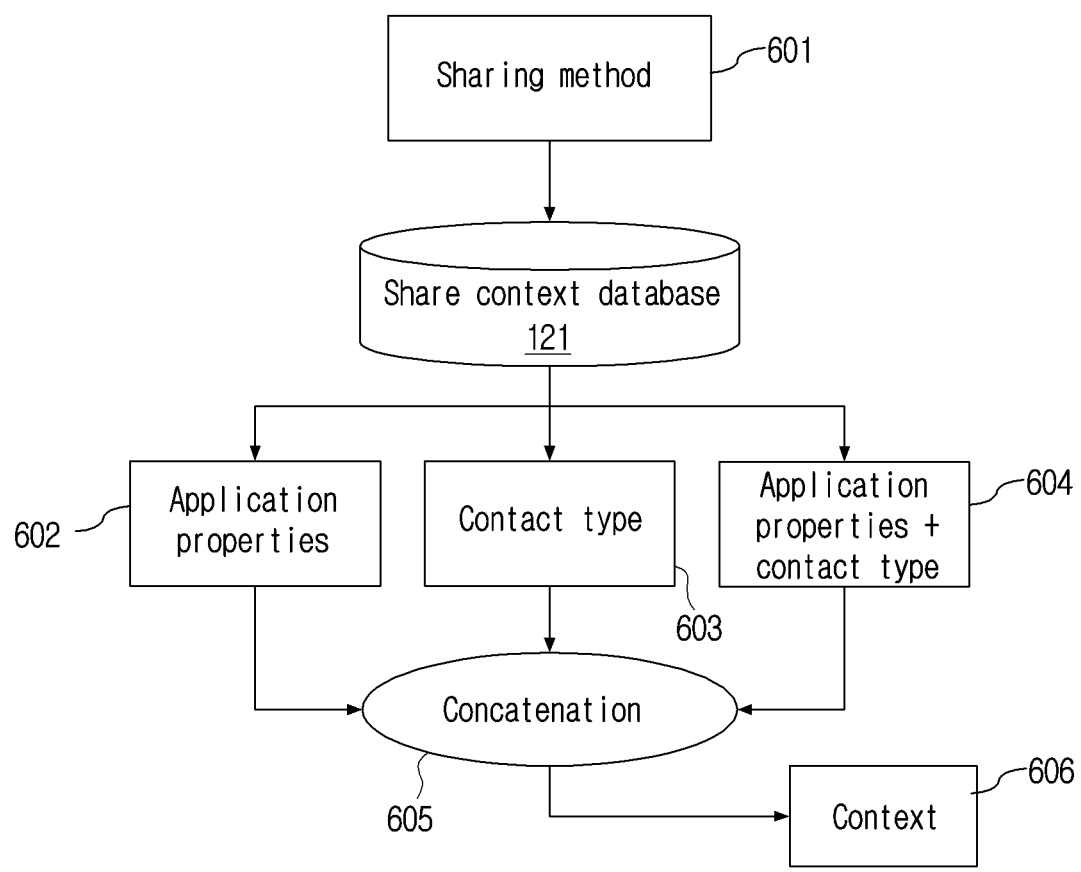
FIG. 6 is a flow diagram illustrating a method for obtaining context of sharing the content by the electronic device, according to an embodiment of the disclosure.

FIG. 6 is a flow diagram illustrating a method for obtaining the context of sharing the content by the electronic device (100), according to an embodiment of the disclosure.

Referring to FIG. 6, the user selects a sharing method at operation 601 in the electronic device (100) for sharing the content, where the sharing method indicates the application and/or the contact to which the content needs to be shared. Further, the electronic device (100) obtains at operations 602 to 604 the application properties and/or the contact type from the share context database (121) based on the application and/or contact indicated in the sharing method. Further, the electronic device (100) creates at operation 606 the context of the content by concatenating at operation 605 the application properties and/or the contact type at operations 602 to 604.

Figure 7:
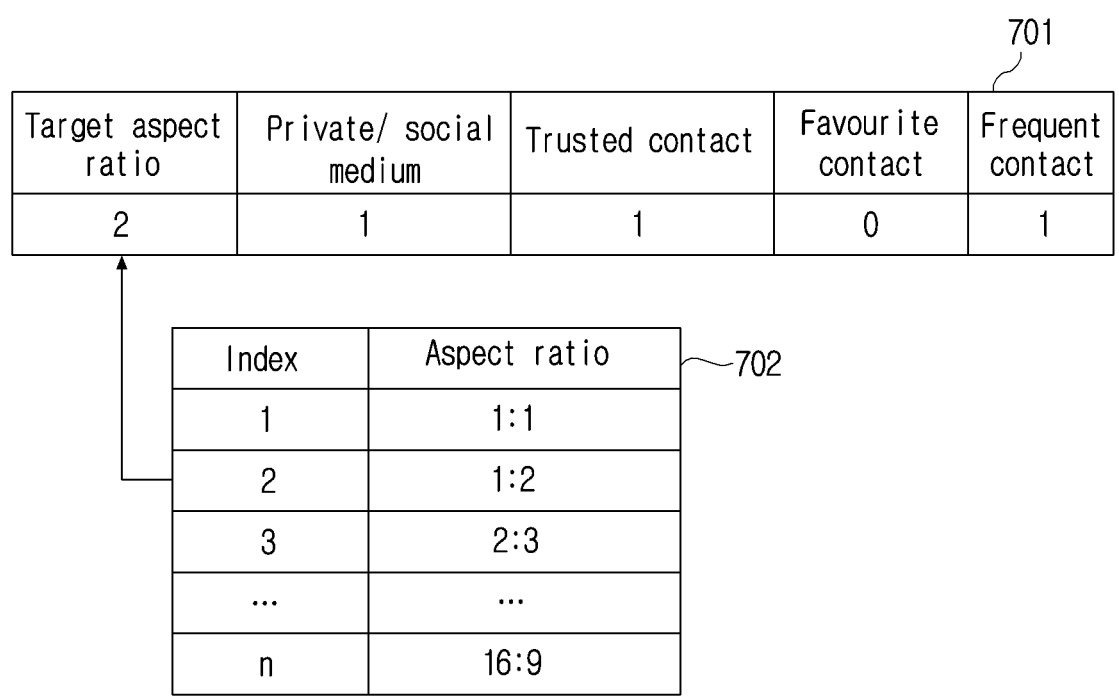
FIG. 7 illustrates an example scenario of determining a contact class and application properties in the context by the electronic device, according to an embodiment of the disclosure.

FIG. 7 illustrates an example scenario of determining the contact class and the application properties in the context by the electronic device (100), according to an embodiment of the disclosure.

Referring to FIG. 7, the share context database (121) also includes classification of the application installed in the electronic device (100) into a one of a social application, a messaging application, etc. The share context database (121) includes metadata about the medium used for sharing the content, details like application name, social or private sharing status of the application, and contact information such as the trusted or favorite or frequent contact. An example of the application+contact is stored as an embedding in the share context database (121) as represented in 701. The embedding includes values for the target aspect ratio (target resolution), the private/social medium, the trusted contact, the favorite contact and the frequent contact.

If value of the private/social medium is 1, then the medium is private. If value of the private/social medium is 0, then the medium is social. If value of the trusted contact is 1, then the contact is the trusted contact. If value of the trusted contact is 0, then the contact is untrusted contact. If value of the favorite contact is 1, then the contact is the favorite contact. If value of the favorite contact is 0, then the contact is unfavorite contact. If value of the frequent contact is 1, then the contact is the frequent contact. If value of the frequent contact is 0, then the contact is infrequent contact. The value of the target aspect ratio refers to the aspect ratio corresponding to the index in a table (702).

Figure 8:
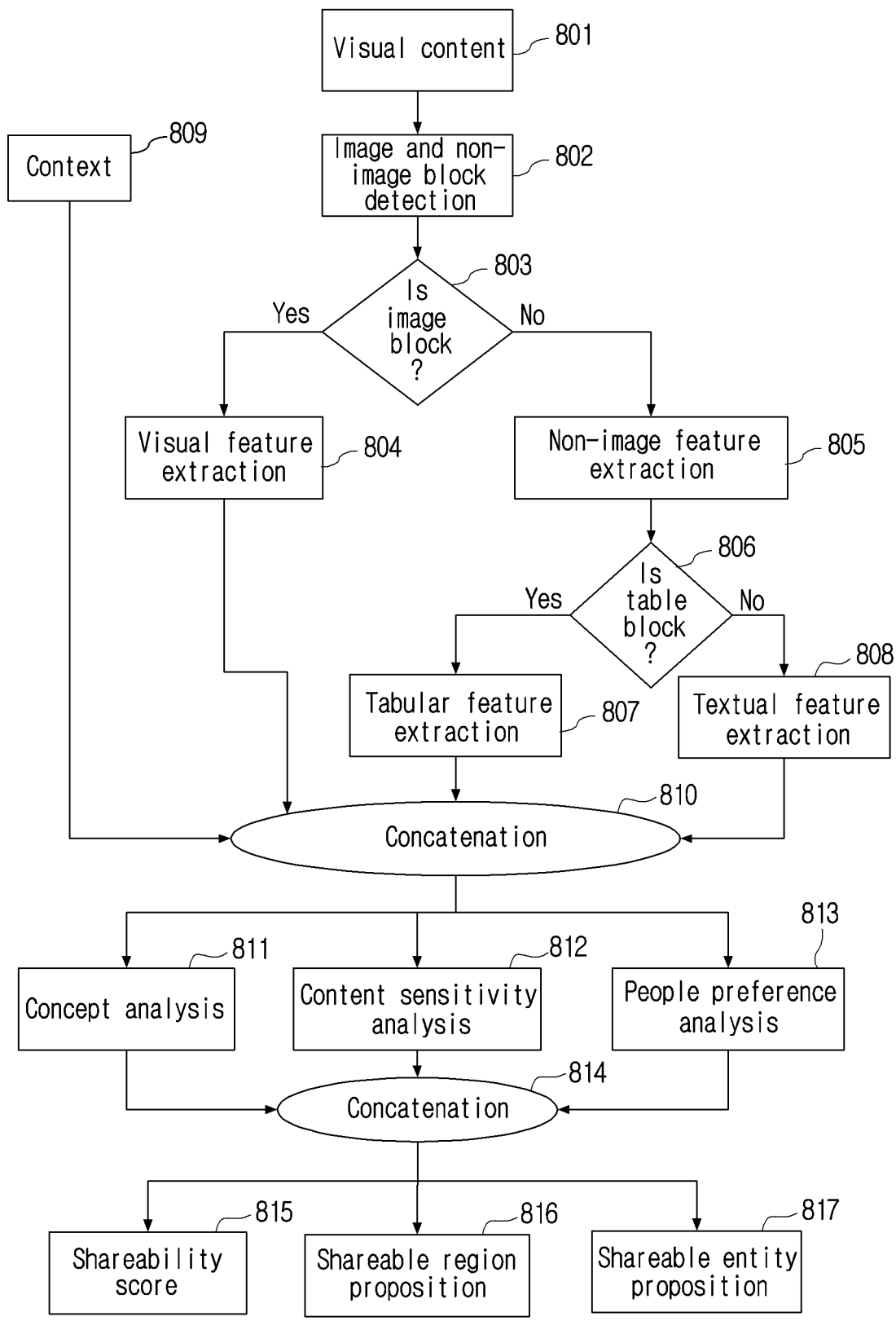
FIG. 8 is a flow diagram illustrating a method for determining a shareability score, a shareable region proposition, and a shareable entity proposition of a visual content by the electronic device, according to an embodiment of the disclosure.

FIG. 8 is a flow diagram illustrating a method for determining the shareability score, the shareable region proposition, and the shareable entity proposition of the visual content by the electronic device (100), according to an embodiment of the disclosure.

Referring to FIG. 8, consider, the electronic device (100) receives the visual content at operation 801 for sharing. Further, the electronic device (100) determines the context at operation 809 of the visual content sharing from the share context database (121). Further, the electronic device (100) identifies the image and non-image block at operation 802 by creating the bounding box on the objects in the content. The electronic device (100) extracts the visual features at operations 803 and 804 from the identified image block. Further, the electronic device (100) extracts the tabular features at operations 805, 806, and 807 from the table blocks in the identified non-image block.

The electronic device (100) extracts the textual features at operations 805, 806, and 808 from the text blocks in the identified non-image block. Further, the electronic device (100) concatenates at operation 810 the context, the visual features, the tabular features, and the textual features, and performs the concept analysis at operation 811, the content sensitivity analysis at operation 812, and the people preference analysis at operation 813 on the concatenated value of the context, the visual features, the tabular features, and the textual features. Further, the electronic device (100) determines the shareability score at operation 815, shareable region proposition at operation 816, and the shareable entity proposition at operation 817 based on a concatenation at operation 814 of outputs obtained from the concept analysis, the content sensitivity analysis, and the people preference analysis.

Figure 9:
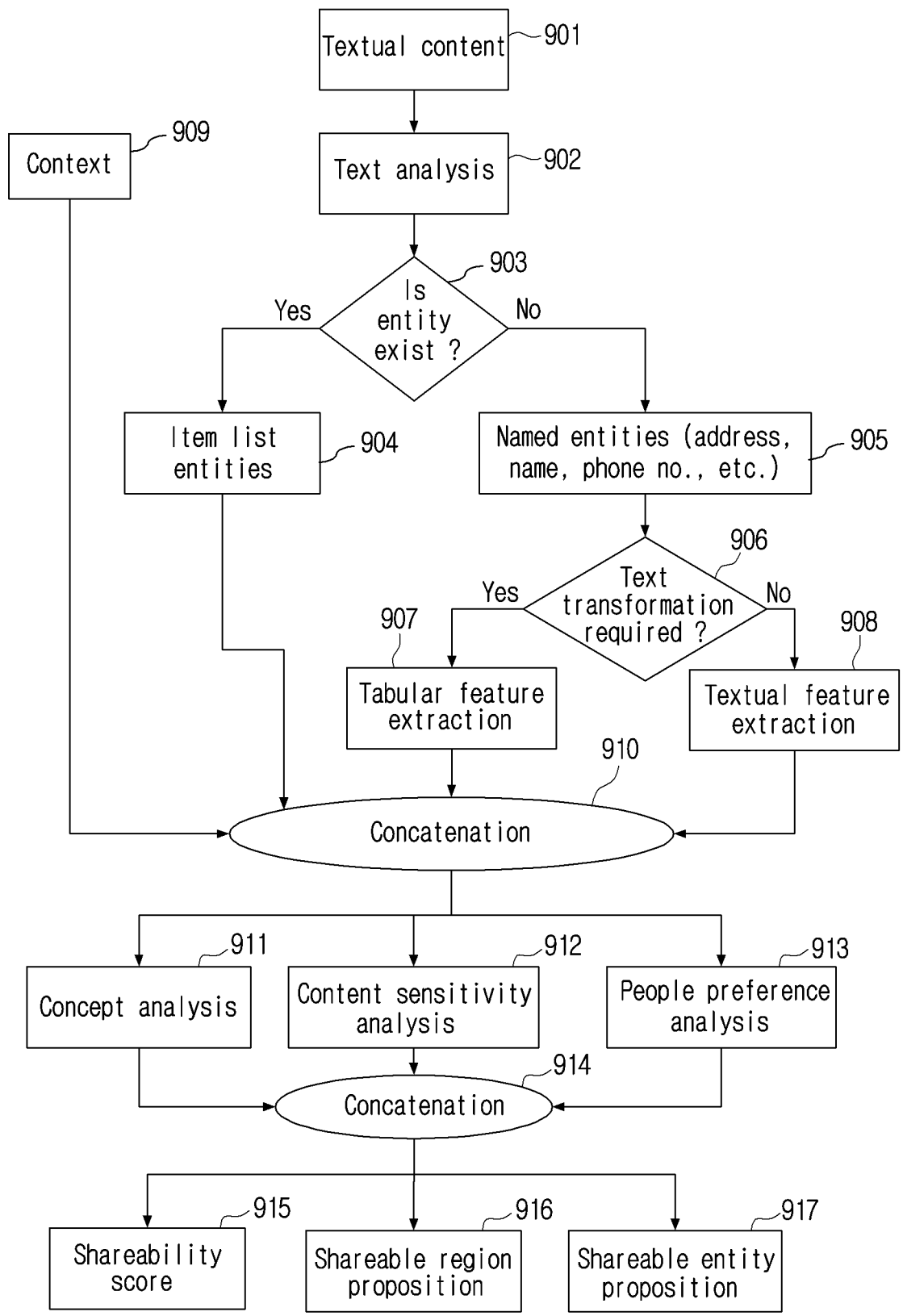
FIG. 9 is a flow diagram illustrating a method for determining the shareability score, the shareable region proposition, and the shareable entity proposition of a textual content by the electronic device, according to an embodiment of the disclosure.

FIG. 9 is a flow diagram illustrating a method for determining the shareability score, the shareable region proposition, and the shareable entity proposition of the textual content by the electronic device (100), according to an embodiment of the disclosure.

Referring to FIG. 9, consider, the electronic device (100) receives the textual content at operation 901 for sharing. Further, the electronic device (100) determines the context at operation 909 of the textual content sharing from the share context database (121). Further, the electronic device (100) checks for the entities in the text by analyzing at operation 902 the text. The electronic device (100) extracts the list of entities at operations 903 to 904) upon finding the entities in the text. The electronic device (100) detects named entities (e.g. address, name, phone no., etc.) at operation 905 based on the text analysis, when the entities are not found in the text. Further, the electronic device (100) checks whether text transformation at operation 906 is required for the named entities.

When text transformation at operation 906 is required, the electronic device (100) extracts the tabular features at operation 907 from the named entities. When text transformation at operation 906 is not required, the electronic device (100) extracts the textual features at operation 908 from the named entities. Further, the electronic device (100) concatenates at operation 910 the context, the visual features, the tabular features, and the textual features, and performs the concept analysis at operation 911, the content sensitivity analysis at operation 912, and the people preference analysis at operation 913 on the concatenated value of the context, the visual features, the tabular features, and the textual features. Further, the electronic device (100) determines the shareability score at operation 915, shareable region proposition at operation 916, and the shareable entity proposition at operation 917 based on a concatenation at operation 914 of outputs obtained from the concept analysis, the content sensitivity analysis, and the people preference analysis.

Figure 10:
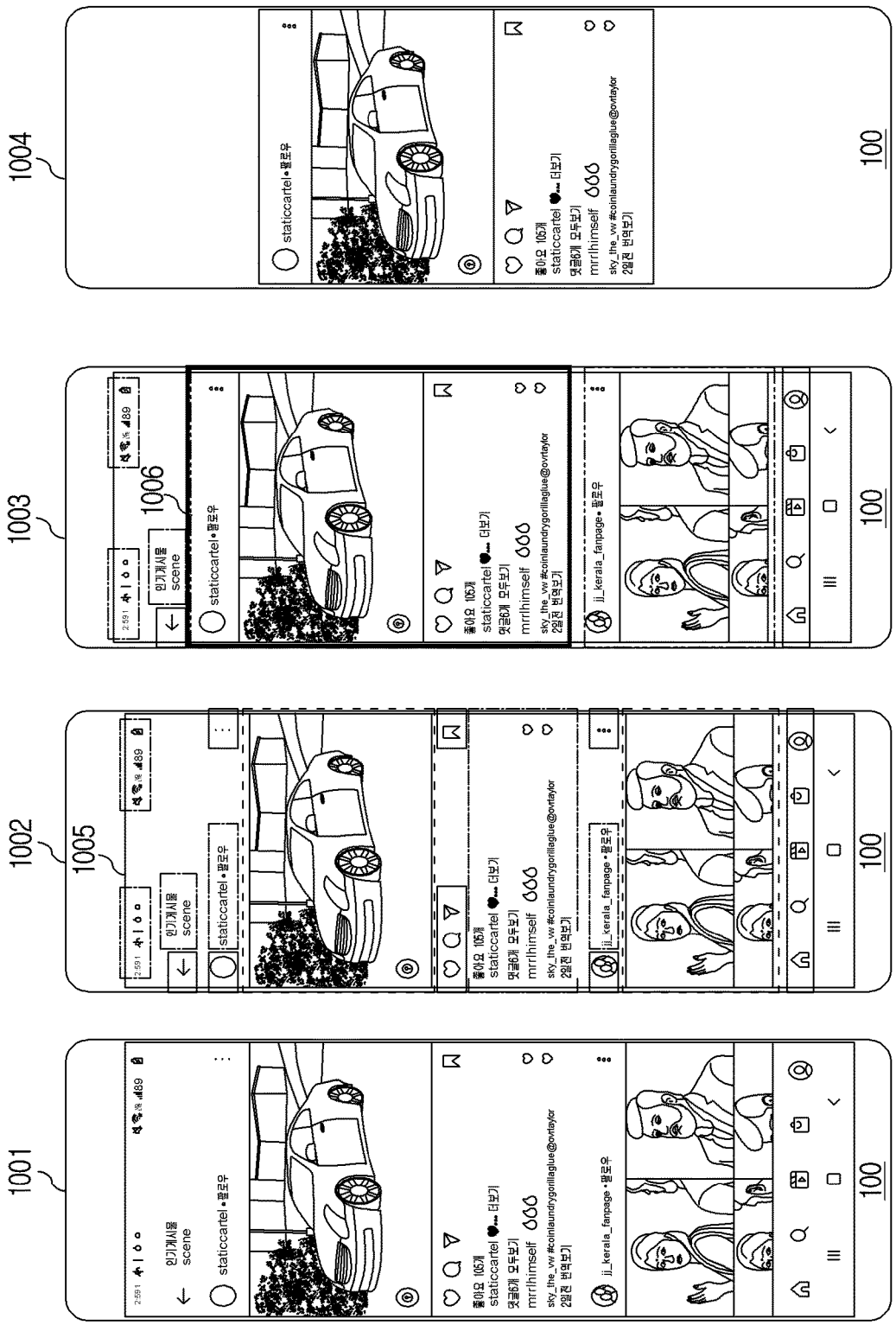
FIG. 10 illustrates an example scenario of determining a shareable region based on bounding boxes by the electronic device, according to an embodiment of the disclosure.

FIG. 10 illustrates an example scenario of determining the shareable region based on the bounding boxes by the electronic device (100), according to an embodiment of the disclosure.

Referring to FIG. 10, consider, the electronic device (100) is displaying a screenshot for sharing at 1001. At 1002, the electronic device (100) analyses the screenshot using the neural network and identifies the bounding boxes (1005) on the objects in the screenshot. Further, the electronic device (100) labels the objects and determines a confidence score of the labelled objects.

If the confidence score of the label is greater than a threshold value (e.g. 0.85), then the electronic device (100) accepts the bounding box of the object. Further, the electronic device (100) determines image blocks and non-image blocks in the snapshot from the bounding box of the object. At 1003, the electronic device (100) performs the concept attention analysis for merging the bounding boxes and identifying the largest bounding box (1006). At 1004, the electronic device (100) crops out the portion in the snapshot other than the portion bounded with the largest bounding box (1006) and suggests the user for sharing.

Figure 11A:
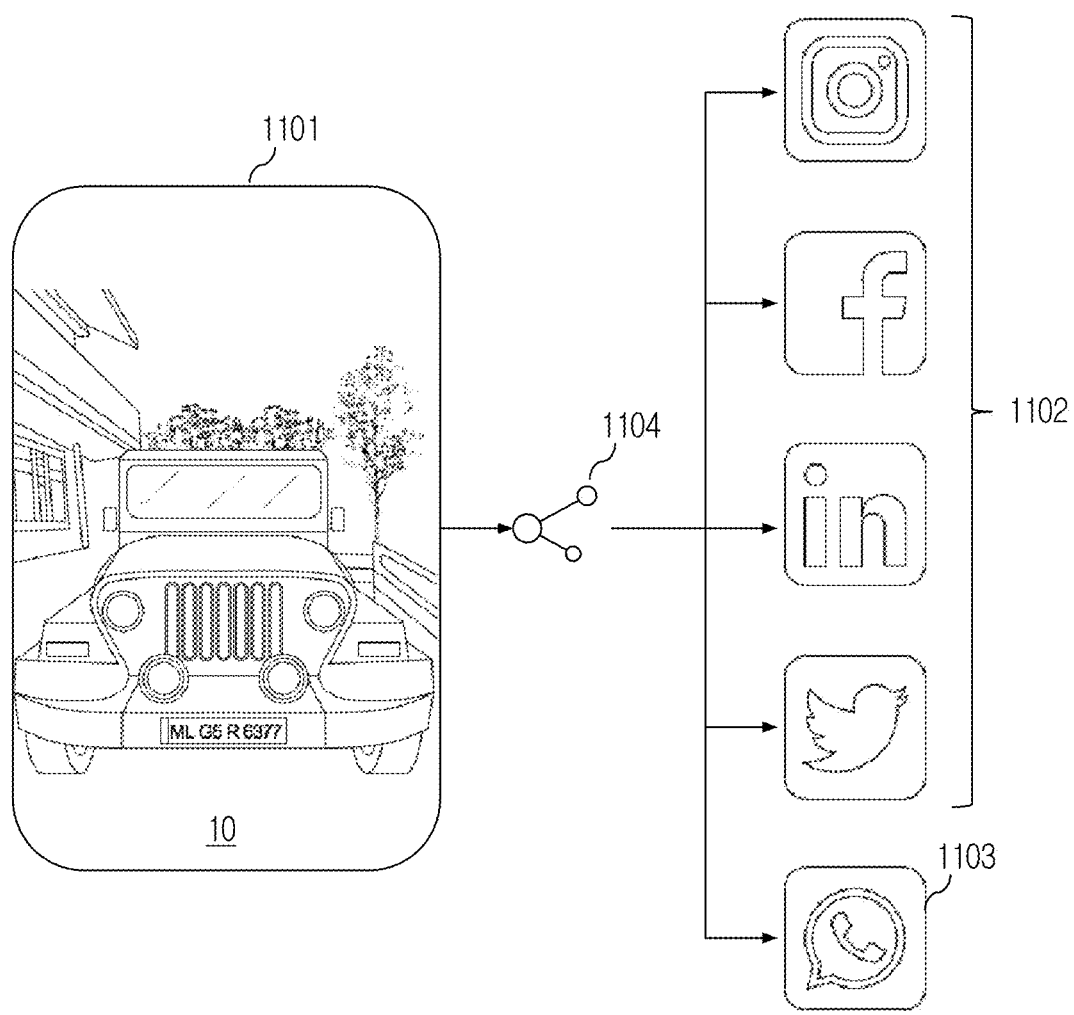
FIGS. 11A and 11B illustrate example scenarios of sharing the content to a private application and the social media applications of the electronic device using the proposed method and the existing method, according to various embodiments of the disclosure.
Figure 11B:
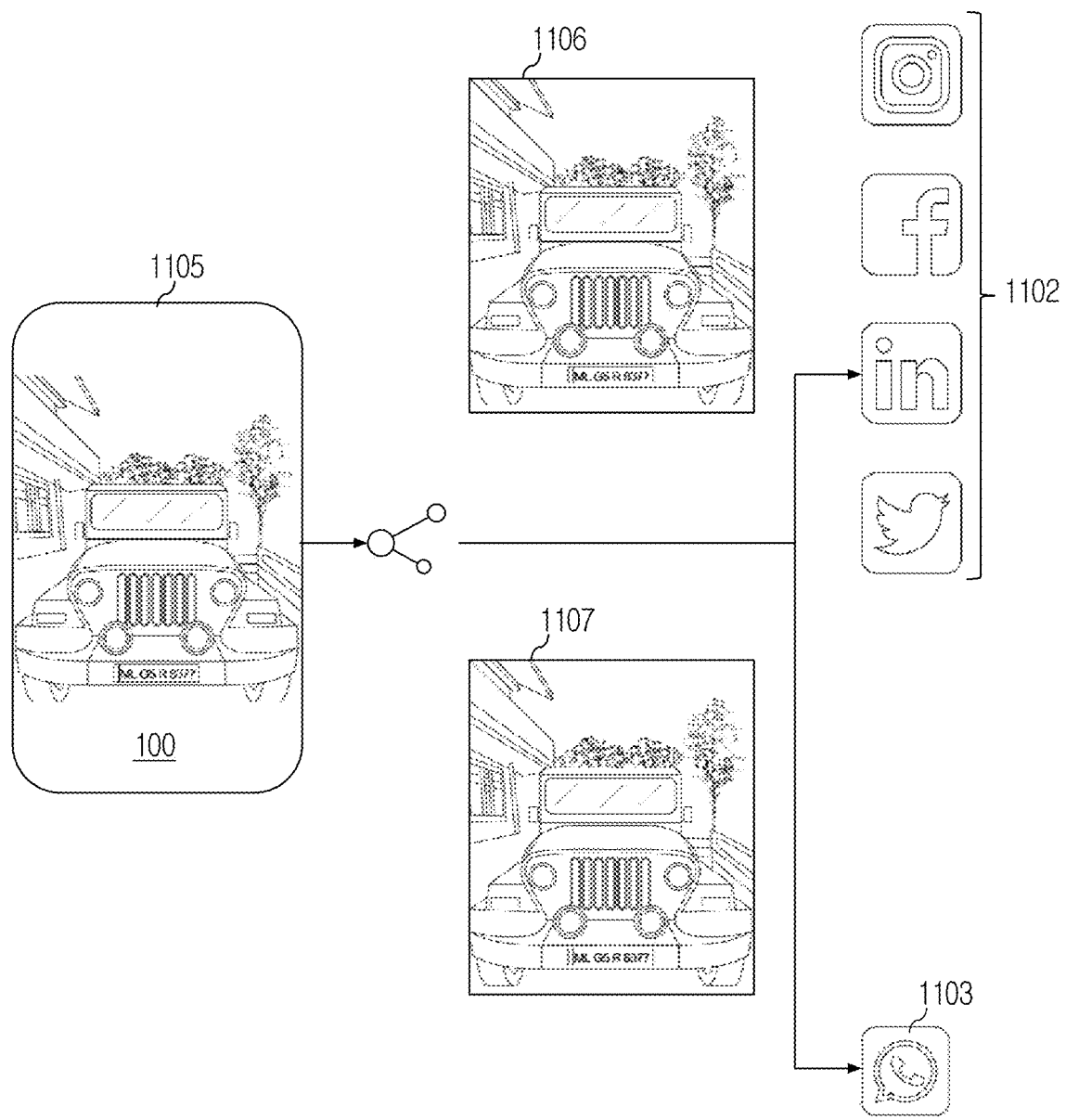

FIGS. 11A and 11B illustrate example scenarios of sharing the content to the private application and the social media applications of the electronic device (100) using the proposed method and the existing method, according to various embodiments of the disclosure. Consider, the social media applications (1102) and the private messaging application (1103) are installed is the electronic device (100).

The example scenario of sharing the content to the social media applications (1102) and the private messaging application (1103) using the existing method is shown in the FIG. 11A. At 1101, consider the conventional device (10) has received a user input for sharing an image of a vehicle with a registration number plate to the social media applications (1102) and the private messaging application (1103), where the registration number plate is the private information. At A1104, the conventional device (10) shares the image of the vehicle with the registration number plate to the private messaging application (1103) as well as the social media applications (1102).

The content is shared as is or common enhancement is applied irrespective of the sharing channel (apps, contacts, etc.). The conventional device (10) does not suggest any sharing channel specific enhancements and shares the image of the vehicle with the registration number plate to the social media applications (1102) without bothering on the privacy and security need to ensure for the private information in the image.

The example scenario of sharing the content to the social media applications (1102) and the private messaging application (1103) using the proposed method is shown in the FIG. 11B. At 1104, consider the electronic device (100) has received the user input for sharing the image of the vehicle with the registration number plate to the social media applications (1102) and the private messaging application (1103), where the registration number plate is the private information. Further, the electronic device (100) detects the medium of the social media applications (1102) as public and the medium of the private messaging application (1103) as private. Upon detecting the public medium, the electronic device (100) suggests enhancements during content sharing based on the medium of sharing. Image shareability is low for public posts over social networking sites.

Multiple modifications (e.g. enhancement+privacy) are performed on the image by the electronic device (100) to increase shareability applied. The electronic device (100) hides the private information when sharing to the unknown contact & the applications for privacy preservation. At 1106, the electronic device (100) masks the registration number plate in the image, and shares the modified image of the vehicle to the social media applications (1102). At 1106, upon detecting the private medium, the electronic device (100) shares the image of the vehicle without any modification to the private messaging application (1103). Image shareability is high for personal contact shares over the private messaging application (1103).

Figure 12:
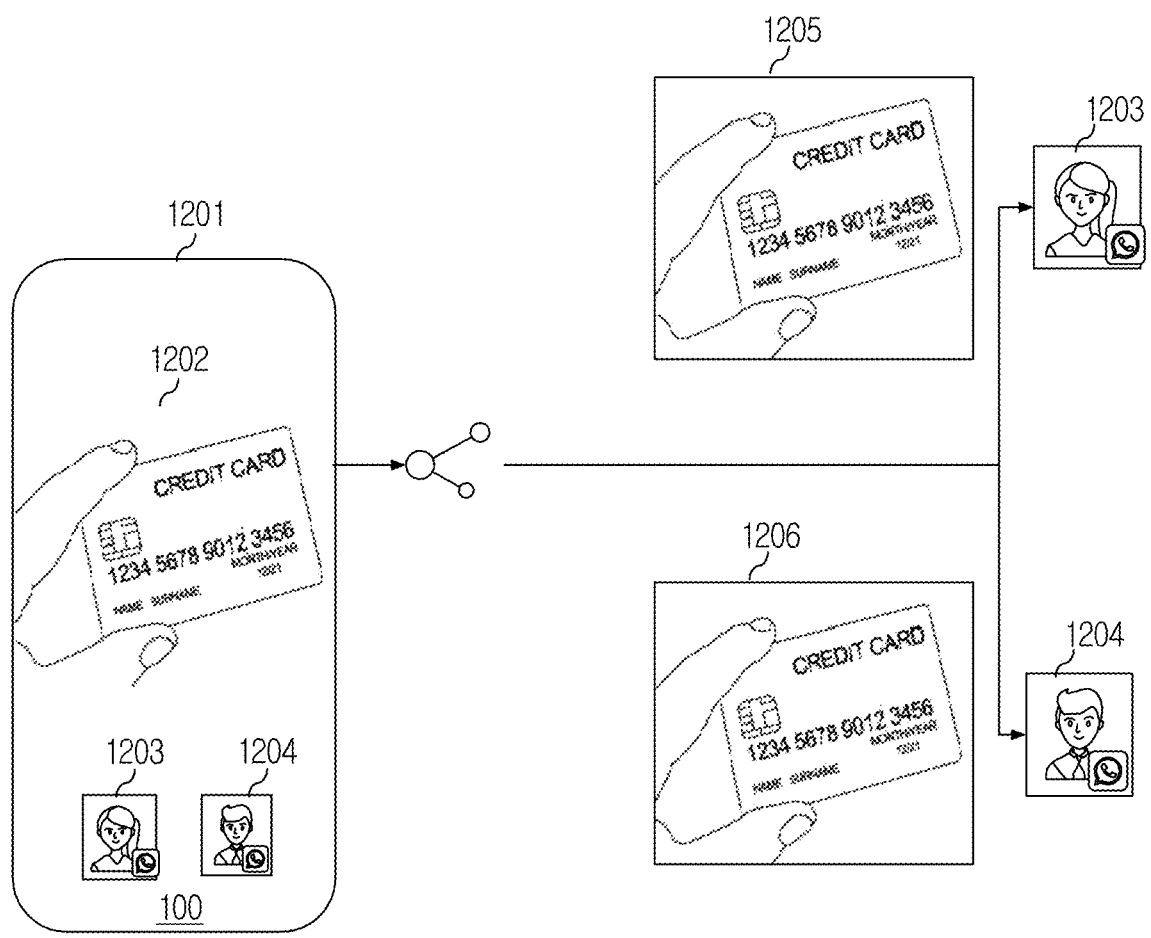
FIG. 12 illustrate an example scenario of sharing the visual content to two contacts in a private messaging application of the electronic device, according to an embodiment of the disclosure.

FIG. 12 illustrate an example scenario of sharing the visual content to two contacts in the private messaging application of the electronic device (100), according to an embodiment of the disclosure.

Referring to FIG. 12, at 1201, consider the electronic device (100) has received the user input for sharing the image (1202) of the financial card (e.g. credit card) to a known contact (1203) and an unknown contact (1204) via the private messaging application of the electronic device (100), where the financial card includes critical information such as card number, name of card holder, etc.

Further, the electronic device (100) detects the medium of the private messaging application (1103) as private. Further, the electronic device (100) determines the contact class of the known contact (1203) as private, and the contact class of the unknown contact (1204) as public. At 1205, upon detecting the private medium and the private class of the contact, the electronic device (100) shares the image of the financial card without any modification to the known contact (1203) through the private messaging application (1103). At 1206, even the medium is private, but due to the public class of the contact, the electronic device (100) shares the image of the financial card to the unknown contact (1204) through the private messaging application (1103) after pixilating the critical information in the image.

Figure 13:
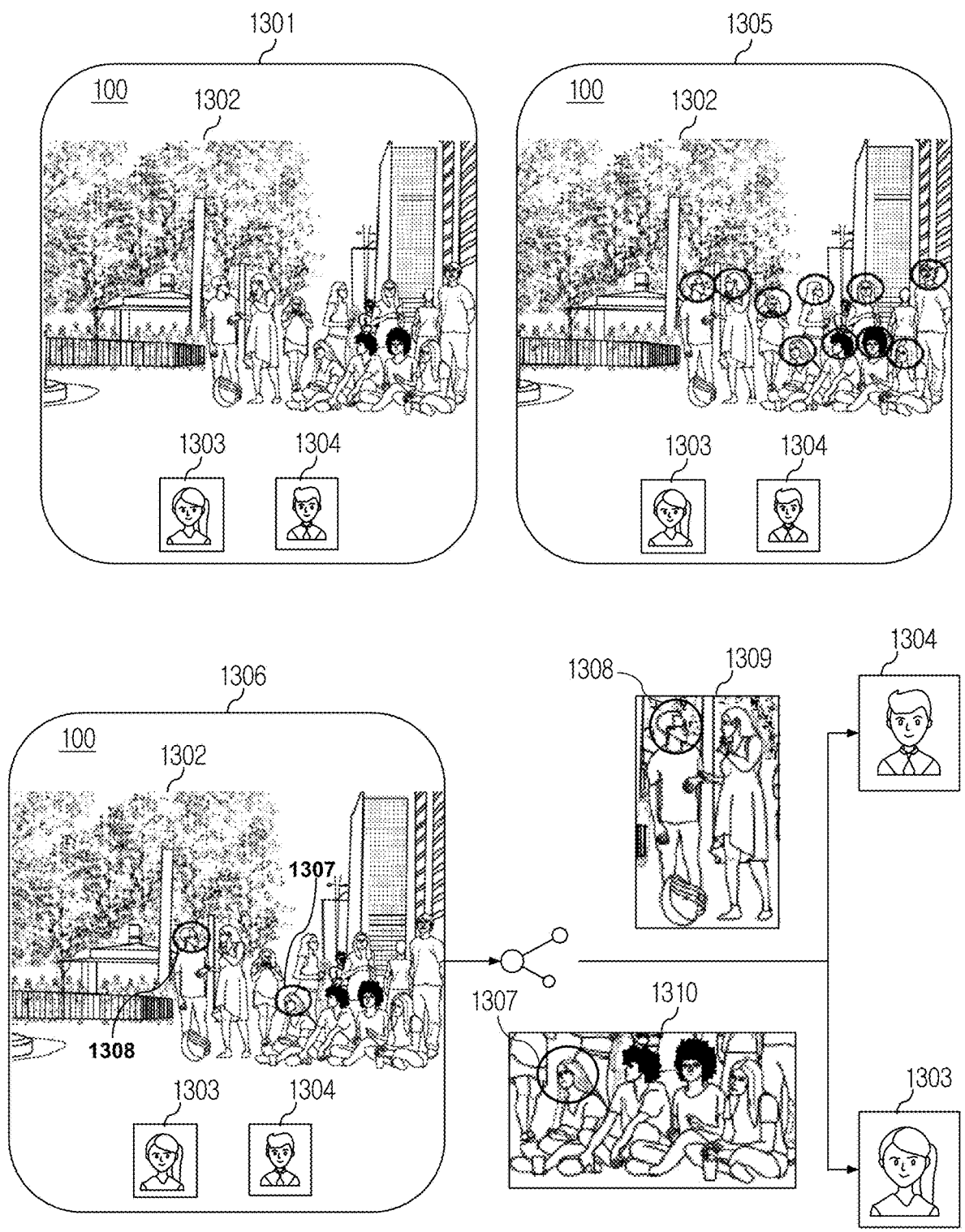
FIG. 13 illustrate an example scenario of sharing the visual content to the two contacts in the electronic device, according to an embodiment of the disclosure.

FIG. 13 illustrate an example scenario of sharing the visual content to the two contacts in the electronic device (100), according to an embodiment of the disclosure.

Referring to FIG. 13, at 1301, consider the electronic device (100) has received the user input for sharing the image (1302) of a group of people to contacts of two persons in that group. Both contacts (1303, 1304) are saved in the electronic device (100). At 1305, the electronic device (100) analyses the image (1302) and detects the people in the image (1302).

At 1306, the electronic device (100) determines the portions (1308, 1307) in the image (1302) containing the detected persons corresponding to the contacts (1303, 1304). Further, the electronic device (100) crops the portion (1309) in the image (1302) containing the person (1308) corresponds to the contact (1304) and shares the portion (1308) to the contact (1304). Similarly, the electronic device (100)

crops the portion (1310) in the image (1302) containing the person (1307) corresponds to the contact (1303) and shares the portion (1310) to the contact (1303).

Figure 14:
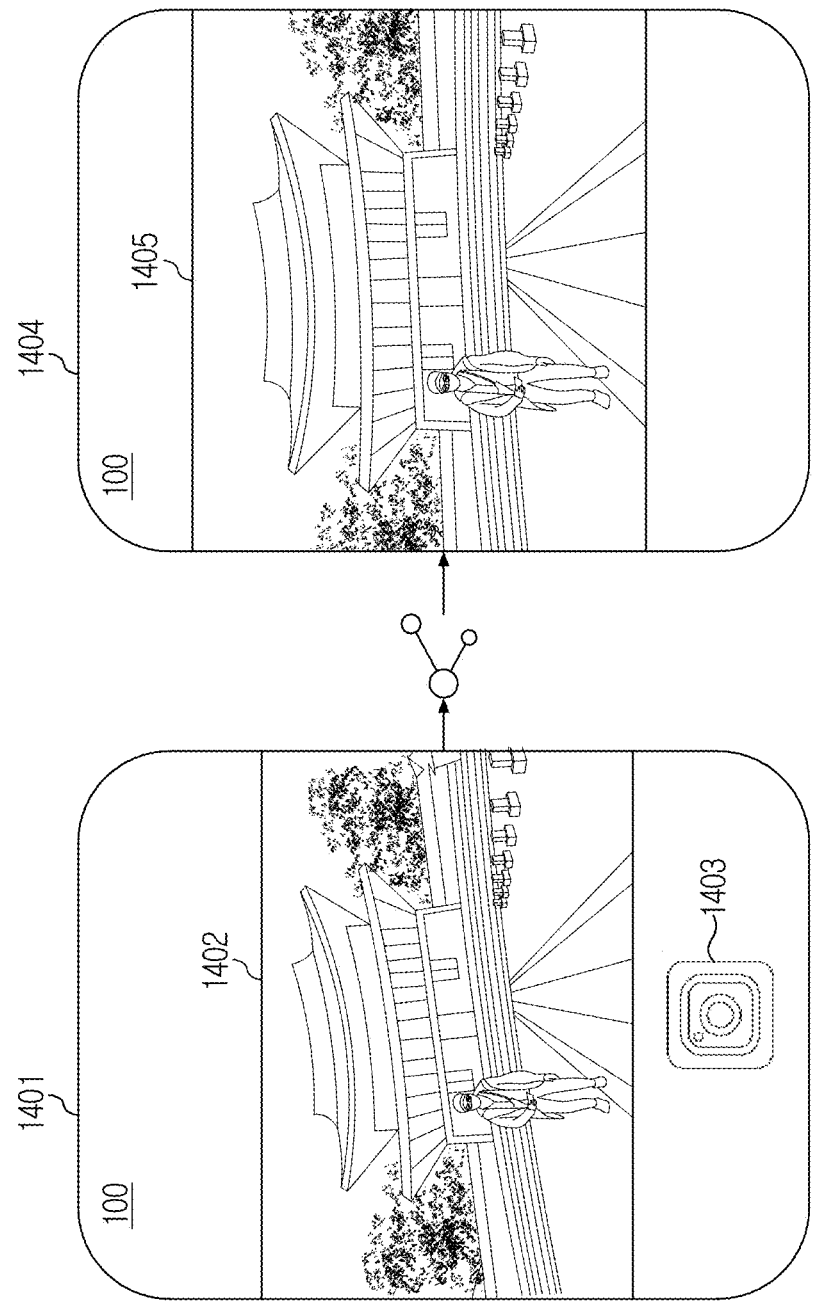
FIG. 14 illustrate an example scenario of sharing the visual content to a social media application in the electronic device, according to an embodiment of the disclosure.

FIG. 14 illustrate an example scenario of sharing the visual content to the social media application in the electronic device (100), according to an embodiment of the disclosure.

Referring to FIG. 14, at 1401, consider the electronic device (100) has received the user input for sharing the image (1402) of a person with a scenic background to the social media application (1403) of the electronic device (100), where the image (1402) is captured with a tilt. Further, the electronic device (100) detects the medium of the social media application (1403) as public. Further, the electronic device (100) determines the aspect ratio recommended for sharing the image (1402) in the social media application (1403). At 1404, upon detecting the private medium and the recommended aspect ratio, the electronic device (100) performs a tilt correction on the image (1402), and crops the image (1402) as per the recommended aspect ratio. Further, the electronic device (100) shares the tilt corrected and cropped image (1405) to the social media application (1403).

Figure 15A:
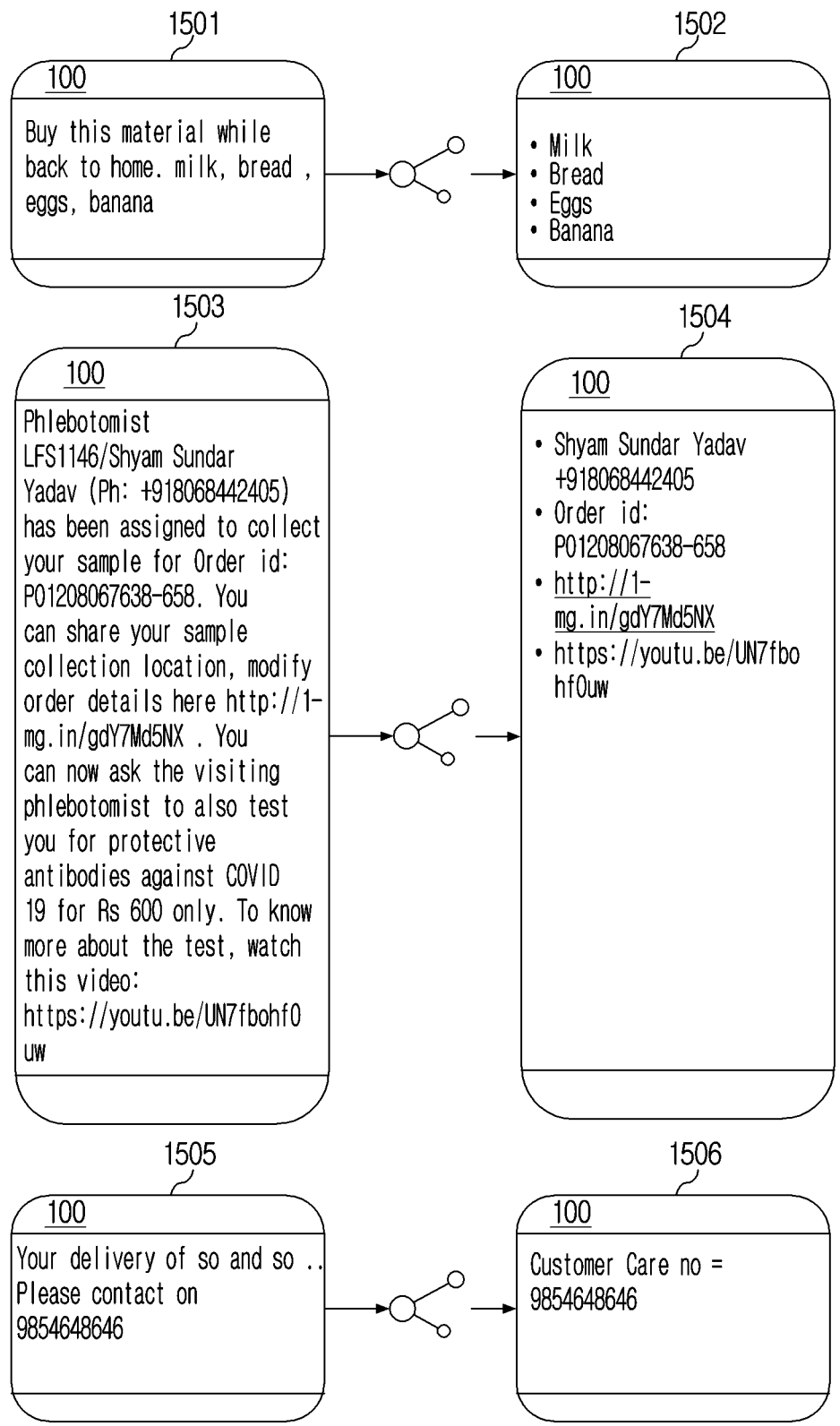
FIGS. 15A and 15B illustrate example scenarios of sharing the textual content to a contact in the electronic device, according to various embodiments of the disclosure.
Figure 15B:
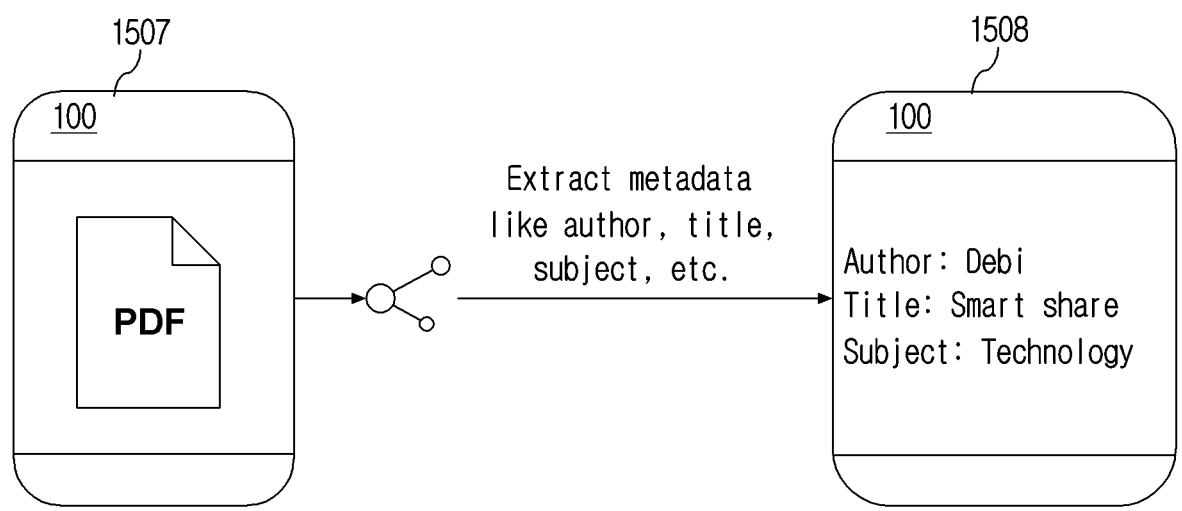

FIGS. 15A and 15B illustrate example scenarios of sharing the textual content to the contact in the electronic device (100), according to various embodiments of the disclosure.

Referring to FIG. 15A, in an example scenario as shown in 1501, the electronic device (100) receives a text "Buy this material while back to home. milk, bread, eggs, banana" for sharing the text to the contact in the electronic device (100). Further, the electronic device (100) identifies the entities in the text. As shown in 1502, the electronic device (100) suggests the entities to the user by formatting the entities to bullet point, applying camel case, and correcting spelling of the entities.

In another example scenario as shown in 1503, the electronic device (100) receives a text "Phlebotomist LFS1146/Shyam Sundar Yadav (Ph: +918068442405) has been assigned to collect your sample for Order id: P01208067638-658. You can share your sample collection location, modify order details here http://1-mg.in/gdY7Md5NX. You can now ask the visiting phlebotomist to also test you for protective antibodies against COVID 19 for Rs 600 only. To know more about the test, watch this video: https://youtu.be/UN7fbohf0uw" for sharing the text to the contact in the electronic device (100). Further, the electronic device (100) identifies the entities in the text. As shown in 1504, the electronic device (100) suggests the entities to the user by formatting the entities to bullet point, applying camel case, and correcting spelling of the entities.

In another example scenario as shown in 1505, the electronic device (100) receives a text "Your delivery of so and so. Please contact on 9854648646" for sharing the text to the contact in the electronic device (100). Further, the electronic device (100) identifies the entities in the text. As shown in 1506, the electronic device (100) suggests the entities to the user by formatting the entities to bullet point, applying camel case, and correcting spelling of the entities.

Referring to FIG. 15B, in another example scenario as shown in 1507, the electronic device (100) receives a document file for sharing to the contact in the electronic device (100). Further, the electronic device (100) identifies the entities in the document file by extract metadata of the file like author, title, subject, etc. As shown in 1508, the electronic device (100) suggests the entities to the user by formatting the entities to bullet point, applying camel case, and correcting spelling of the entities.

The embodiments disclosed herein can be implemented using hardware device to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for intelligently sharing a content by an electronic device, the method comprising:
   determining, by the electronic device, a context of sharing the content;
   analyzing, by the electronic device, the content with reference to the context;
   identifying, by the electronic device, at least one portion of the content as non-shareable based on the analysis; and
   providing, by the electronic device, at least one modification action suggestion on the at least one portion identified as non-shareable,
   wherein the determining of the context of sharing the content comprises:
      receiving, by the electronic device, a trigger to share the content to at least one contact in the electronic device through an application,
      fetching, by the electronic device, at least one of a contact class of the at least one contact and application properties of the application from a share context database, and
      determining, by the electronic device, the context of sharing the content by concatenating the at least one of the contact class and the application properties.

2. The method as claimed in claim 1,
   wherein the context comprises a contact class and application properties,
   wherein the contact class comprises classification of contacts in the electronic device into a private contact or a public contact, and
   wherein the application properties comprise a target image resolution and a medium type of an application.

3. The method as claimed in claim 1, wherein the at least one modification action suggestion comprises cropping, masking, blurring, pixelating, or beautification.

4. A method for intelligently sharing a content by an electronic device, the method comprising:
   determining, by the electronic device, a context of sharing the content;
   analyzing, by the electronic device, the content with reference to the context;
   identifying, by the electronic device, at least one portion of the content as non-shareable based on the analysis; and
   providing, by the electronic device, at least one modification action suggestion on the at least one portion identified as non-shareable, wherein the identifying of the at least one portion of the content as non-shareable based on the analysis comprises:
  detecting, by the electronic device, a first text and a visual portion in the content, wherein the visual portion comprises a text block, a tabular block, and an image,
  identifying, by the electronic device, the image in the visual portion by creating a plurality of bounding boxes on the text block, the tabular block and the image,
  extracting, by the electronic device, a second text from the text block and the tabular block,
  determining, by the electronic device, a semantic description of the identified image,
  estimating, by the electronic device, a shareability score for each portion of the content based on at least one of the first text, the second text, the semantic description, or the context, and
  identifying, by the electronic device, the at least one portion of the content with the shareability score less than a threshold shareability score as non-shareable.

5. The method as claimed in claim 4, wherein the estimating of the shareability score for each portion of the content based on at least one of the first text, the second text, the semantic description, or the context comprises:
  determining, by the electronic device, sensitivity of the content based on at least one of the first text, the second text, or the semantic description;
  identifying, by the electronic device, a medium type of an application and a contact class from the context; and
  determining, by the electronic device, the shareability score based on the sensitivity of the content, the medium type of the application, and the contact class from the context.

6. The method as claimed in claim 4, wherein the identifying of the image in the visual portion by creating the plurality of bounding boxes on the text block, the tabular block, and the image comprises:
  determining, by the electronic device, a relation between the plurality of bounding boxes by analyzing the text block, the tabular block, and the image using a neural network;
  merging, by the electronic device, two or more bounding boxes in the plurality of bounding boxes based on the relation between the plurality of bounding boxes; and
  selecting, by the electronic device, a largest bounding box as the image in the visual portion upon merging two or more bounding boxes.

7. An electronic device for intelligently sharing a content, the electronic device comprising:
  a memory;
  a processor; and
  a multi-fold content transformer, coupled to the memory and the processor, configured to:
  determine a context of sharing the content,
  analyze the content with reference to the context,
  identify at least one portion of the content as non-shareable based on the analysis, and
  provide at least one modification action suggestion on the at least one portion identified as non-shareable,
  wherein the multi-fold content transformer further configured to:
    receive a trigger to share the content to at least one contact in the electronic device through an application,
    fetch at least one of a contact class of the at least one contact and application properties of the application from a share context database, and
    determine the context of sharing the content by concatenating the at least one of the contact class and the application properties.

8. The electronic device as claimed in claim 7,
  wherein the context comprises a contact class and application properties,
  wherein the contact class comprises classification of contacts in the electronic device into a private contact or a public contact, and
  wherein the application properties comprise a target image resolution and a medium type of an application.

9. The electronic device as claimed in claim 7, wherein the at least one modification action suggestion comprises cropping, masking, blurring, pixelating, or beautification.

* * * * *